United States Patent
Header

(10) Patent No.: US 9,743,651 B2
(45) Date of Patent: Aug. 29, 2017

(54) FISHING REEL HANDLE DRAG SYSTEM

(71) Applicant: Gregory A. Header, Richland, PA (US)

(72) Inventor: Gregory A. Header, Richland, PA (US)

(*) Notice: Subject to any disclaimer, the term of this patent is extended or adjusted under 35 U.S.C. 154(b) by 387 days.

(21) Appl. No.: 14/559,543

(22) Filed: Dec. 3, 2014

(65) Prior Publication Data

US 2016/0157473 A1    Jun. 9, 2016

(51) Int. Cl.
*A01K 89/01* (2006.01)
*A01K 89/033* (2006.01)
*A01K 89/00* (2006.01)
*A01K 89/016* (2006.01)

(52) U.S. Cl.
CPC .......... *A01K 89/033* (2013.01); *A01K 89/006* (2013.01); *A01K 89/016* (2013.01)

(58) Field of Classification Search
CPC .. A01K 89/015; A01K 89/016; A01K 89/033; A01K 89/058; A01K 89/059
USPC ............... 242/265, 266, 304, 291, 317, 284
See application file for complete search history.

(56) References Cited

U.S. PATENT DOCUMENTS

| | | | |
|---|---|---|---|
| 391,992 A * | 10/1888 | Turner ................. | A01K 89/015 242/259 |
| 397,198 A | 2/1889 | Meisselbach | |
| 847,874 A * | 3/1907 | Andree ............... | A01K 89/015 242/265 |
| 1,077,461 A * | 11/1913 | Dutcher .............. | A01K 89/015 242/265 |
| 1,807,433 A * | 5/1931 | Pflueger ............. | A01K 89/015 242/304 |
| 1,866,052 A | 7/1932 | Ohara et al. | |
| 2,502,814 A * | 4/1950 | Bater ................... | A01K 89/033 188/72.9 |
| 2,548,174 A | 4/1951 | Rastler | |
| 2,591,204 A * | 4/1952 | Schnepel ............ | A01K 89/015 242/252 |
| 2,643,073 A * | 6/1953 | Bourne ............... | A01K 89/015 242/265 |
| 3,255,982 A * | 6/1966 | Leon .................... | A01K 89/015 242/228 |
| 3,326,492 A * | 6/1967 | Eugen .................. | A01K 89/02 192/94 |

(Continued)

*Primary Examiner* — Emmanuel M Marcelo
(74) *Attorney, Agent, or Firm* — Shlesinger, Arkwright & Garvey LLP

(57) ABSTRACT

The invention is a fishing reel handle drag system and a fishing reel having a handle drag system which comprises a reel housing, a shaft extending through the housing, a reel spool is mounted on the spindle and has at least one spool face, the spool is rotatable in first and second opposite directions, a crank or handle member is provided for rotating the spool in a first direction, an anti-reversing device is provided to prevent the crank from rotating with the spool when moving in the second direction, the crank is secured to one end of the shaft adjacent the spool face, the crank is adapted to lever axially toward and away from the spool face, a wave washer is provided on the shaft between the crank member and the spool face whereby when the spool is rotated in the second direction and the crank member is levered toward the spool face the wave washer is caused to be compressed against the spool face to thereby generate drag against the rotating spool.

23 Claims, 6 Drawing Sheets

(56) References Cited

U.S. PATENT DOCUMENTS

| | | | |
|---|---|---|---|
| 3,434,676 A | 3/1969 | Bogue | |
| 3,467,336 A | 9/1969 | Appleton | |
| 3,572,608 A * | 3/1971 | Schultz | A01K 89/027 242/266 |
| 3,591,107 A | 7/1971 | Ferguson | |
| 3,697,012 A | 10/1972 | Walker | |
| 3,708,137 A | 1/1973 | Jones | |
| 3,720,386 A | 3/1973 | Morner | |
| 4,442,983 A | 4/1984 | Moll | |
| 4,524,921 A * | 6/1985 | Ozaki | A01K 89/006 242/284 |
| 4,728,053 A | 3/1988 | Hitomi | |
| 4,728,054 A | 3/1988 | Pisapio | |
| 4,730,782 A | 3/1988 | Young | |
| 4,958,785 A | 9/1990 | Aoki | |
| 5,120,003 A | 6/1992 | Sacconi | |
| 5,285,985 A | 2/1994 | Sakaguchi | |
| 5,556,049 A * | 9/1996 | Bennett | A01K 89/016 242/295 |
| 5,626,303 A * | 5/1997 | Bringsen | A01K 89/016 242/265 |
| 6,193,182 B1 | 2/2001 | Capra | |
| 6,508,426 B1 | 1/2003 | Whittle-Herbert | |
| 6,513,743 B1 | 2/2003 | Perkins, Jr. et al. | |
| 6,964,388 B1 | 11/2005 | Ritter | |
| 7,108,214 B2 * | 9/2006 | Ikuta | A01K 89/033 242/246 |
| 7,168,647 B1 | 1/2007 | Kang | |
| 7,178,752 B1 * | 2/2007 | Chang | A01K 89/006 242/284 |
| 7,694,907 B2 | 4/2010 | Chivarov et al. | |
| 2004/0075005 A1 * | 4/2004 | Myojo | A01K 89/015 242/310 |
| 2009/0179100 A1 | 7/2009 | Crofoot | |
| 2010/0006690 A1 * | 1/2010 | Takechi | A01K 89/033 242/396.5 |
| 2013/0037644 A1 | 2/2013 | Bradley | |
| 2014/0151484 A1 * | 6/2014 | Header | A01K 89/033 242/295 |

\* cited by examiner

FISHING REEL HANDLE DRAG SYSTEM

FIELD OF THE INVENTION

This invention relates to fishing reels and in particular, a drag system for anti-reverse type fishing reels.

BACKGROUND OF THE INVENTION

A fishing reel provides several functions. It stores the line on the reel spool. It enables a user to rewind a deployed line back onto the spool. A reel is often provided with a drag mechanism that allows the user to make adjustment for forces applied to the line while a fish is hooked. Reel drag permits slippage of the reel spool relative to the reel shaft and crank (or handle) so that the fishing line is stripped off the spool in a controlled fashion; for example, when a fish applies a force in excess of the strength of the leader. A drag mechanism should permit quick adjustment because forces applied to the line may arise suddenly and vary greatly depending upon several factors, such as the weight of the fish pulling the line.

Prior art reels typically position the drag control knob on the side of the reel that is opposite the crank or handle. This is disadvantageous because a fisherman is then forced to remove his or her hand from the crank in order to adjust the drag. If this occurs when a fish is producing a hard run on the line, the reel is caused to "spool out" whereby excessive line is deployed by the moving fish. This will delay landing of the fish. Excessive slack on the line can result in the fish being unhooked or breaking of the leader prior to landing.

Prior art fishing reels having a handle attached to the spool are often provided with an anti-reversing mechanism to prevent the reel handle from injuring a fisherman if a large fish is hooked and the drag has not yet been adjusted to compensate. The anti-reversing mechanism prevents the handle from rotating with the reel as it rapidly spins in a reverse direction. Anti-reversing reels permit the spool to rotate independent of the reel shaft and crank and in a direction that enables the line to unspool in a controlled manner.

BRIEF SUMMARY OF THE INVENTION

The invention is a fishing reel with drag system comprising a reel housing, a shaft or spindle having first and second ends, the first end of the spindle is secured to the reel housing, a reel spool is mounted on the spindle and has at least one spool face, the spool being rotatable in first and second opposite directions, a crank or handle member is provided for rotating the spool in a first direction, an anti-reversing means is provided to prevent the crank from rotating with the spool when moving in the second direction, the crank is secured to the second end of the shaft and is adjacent the spool face, the crank is adapted to lever axially toward and away from the adjacent spool face, a wave washer is provided on the shaft and between the crank member and the spool face whereby when the spool is rotated in the second direction and the crank member is levered toward the spool face by the user it will cause the wave washer to be compressed against the spool face to thereby generate drag on the spool as it rotates.

In another embodiment, the present invention is a fishing reel with drag system comprising a reel housing, a shaft or spindle having first and second ends, the first end of the spindle is secured to the reel housing, a reel spool is mounted on the spindle and has at least one spool face, the spool being rotatable in first and second opposite directions, a crank or handle member is provided for rotating the spool in a first direction, an anti-reversing means is provided to prevent the crank from rotating with the spool when moving in the second direction, the crank is secured to the second end of the shaft and is adjacent the spool face, the crank is adapted to lever axially toward and away from the adjacent spool face, a spring is provided around the shaft and between the crank member and the spool face whereby when the spool is rotated in the second direction and the crank member is levered toward the spool face by a user it causes the spring to be compressed against the spool face to generate drag on the spool as it rotates.

DETAILED DESCRIPTION OF THE INVENTION

Figure 1:
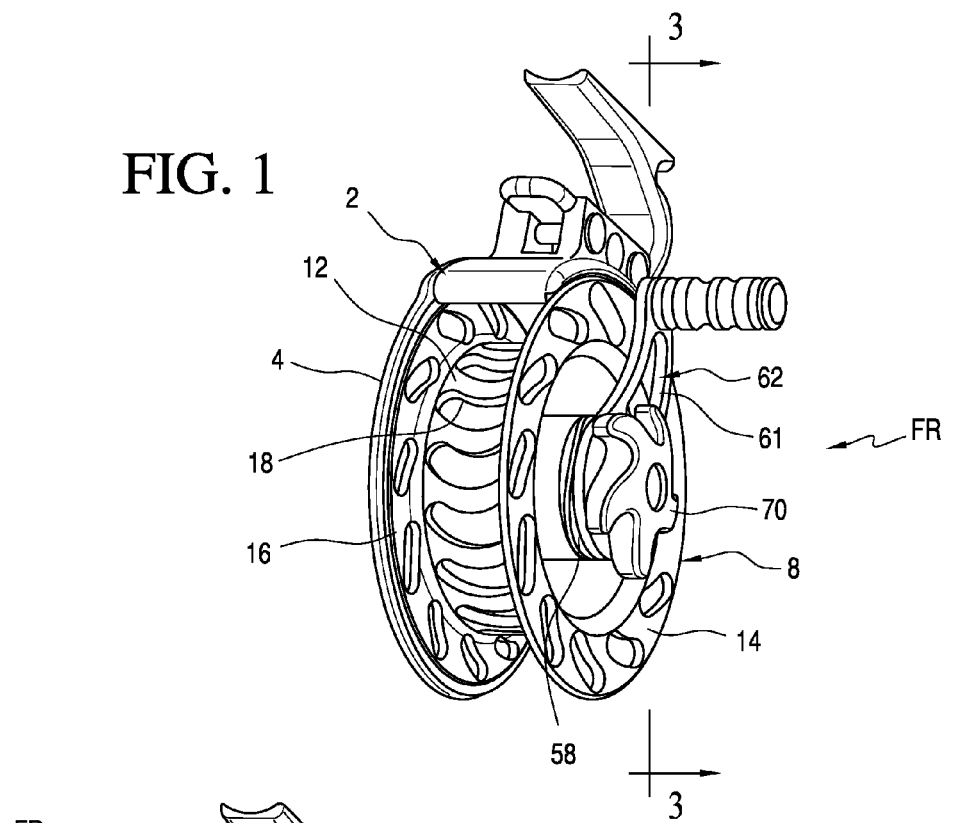
FIG. 1 is a perspective view of one type of fishing reel having the drag system according to the present invention.
Figure 2:
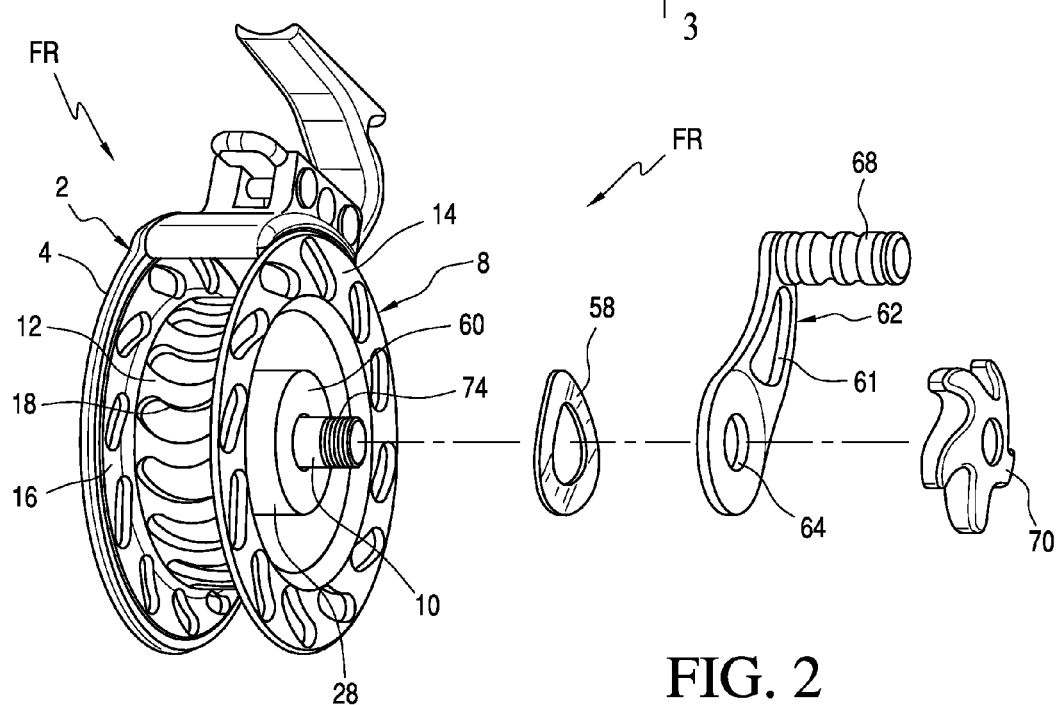
FIG. 2 is a partially exploded perspective view of the FIG. 1.
Figure 3:
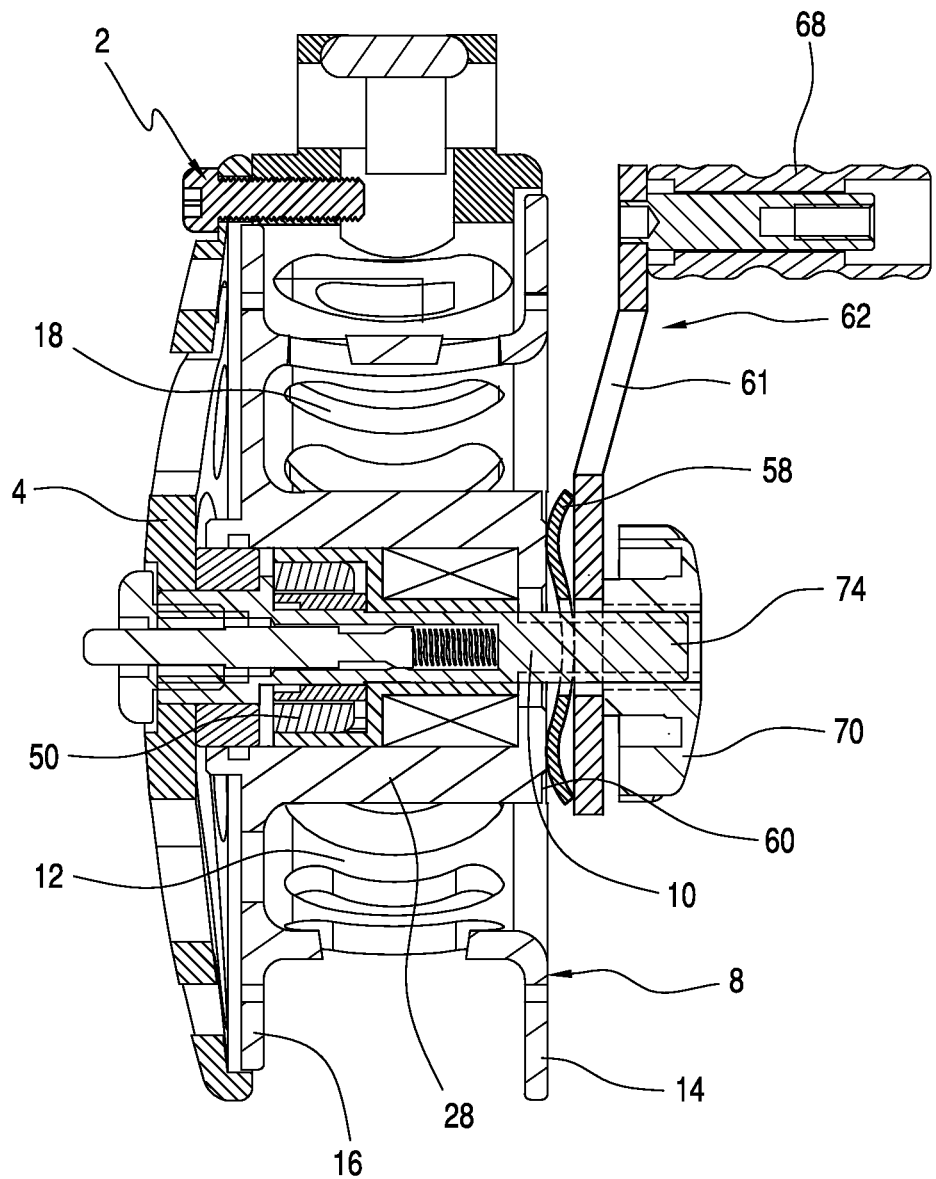
FIG. 3 is a cross section of the reel shown in FIG. 1 taken along line 3-3.

Turning to FIGS. 1 through 3, a fishing reel FR having the handle drag system of the present invention is shown. The present invention is adapted for use with all fishing reels having a configuration that allows drag to be applied to the face of the reel spool including, but not limited to, fly fishing reels, bait casting reels, spear fishing reels, bow fishing reels, spin reels and Aussie-style fishing reels. FIG. 1 illustrates one such reel that is shown to comprise a reel spool 8 rotatably supported on a spindle 10 secured at one end to a housing 2. Reel housing 2 has a circumferential back plate or side wall 4.

Spool 8 comprises a tubular portion 12 having radially extending side walls 14, 16 that cooperate to provide a channel around which a fishing line (not shown) may be stored. Spool 8 is provided with a centrally disposed spool hub 28 having an end face 60. Hub 28 may optionally be provided with an interior drag assembly 26 for use in combination with the handle drag assembly of the present invention as will be further explained below. As is apparent, the handle drag assembly of the present invention will provide sufficient drag without the need for a supplemental drag mechanism. However, in some situations the present invention may be used in combination with an optional interior drag assembly to provide supplemental drag.

The reel housing 2, reel spool 8 and tubular portion 12 are provided with optional passageways 18 that extend through these structures to reduce the overall weight of the reel.

Figure 5:
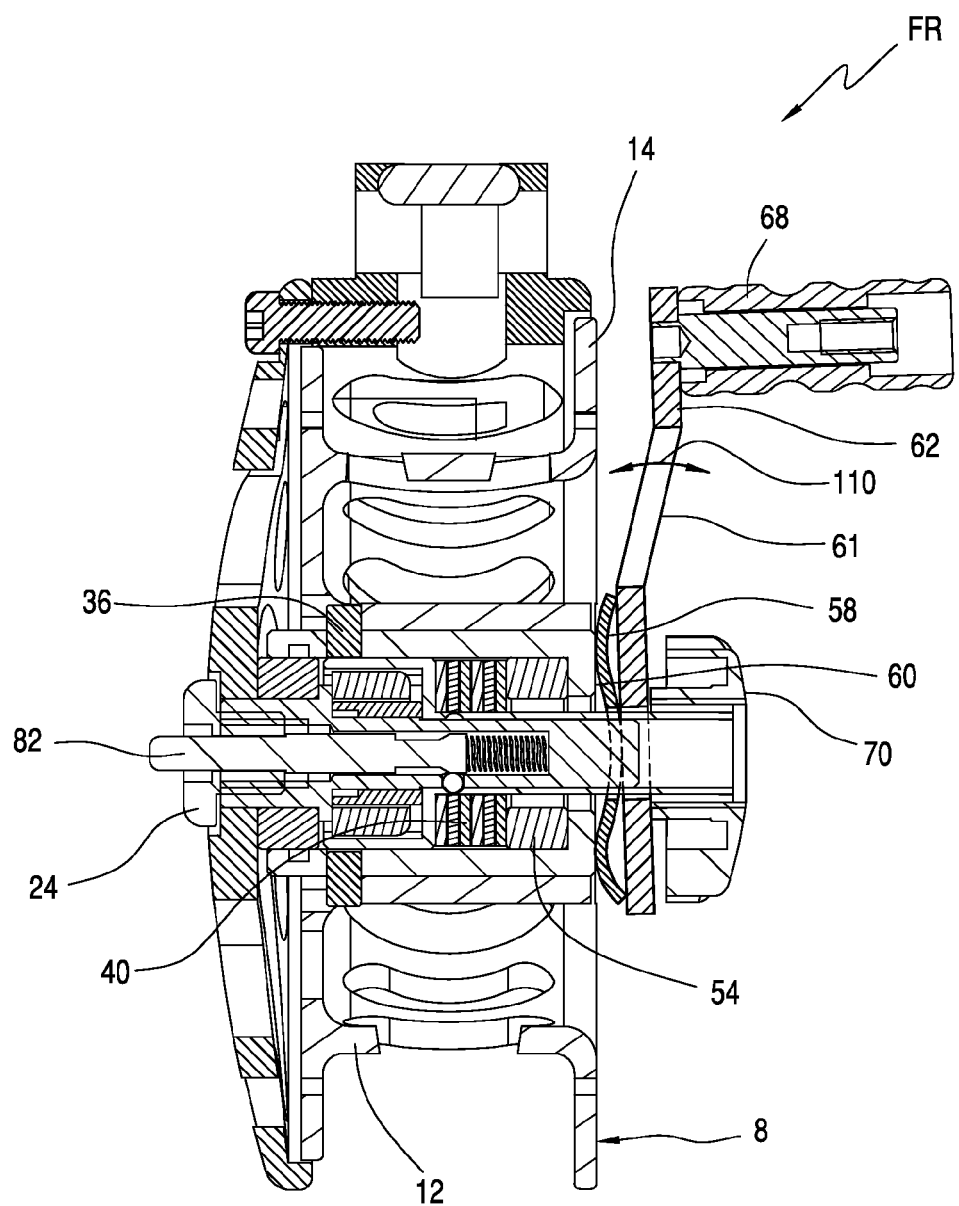
FIG. 5 is a cross section of the reel shown in FIG. 4 and showing the reel crank levered inwardly toward the spool face to create drag.

The handle drag system of the present invention is best seen in FIGS. 2 and 3. A spool sleeve receives a rotating spindle 10. One end of the spool sleeve is provided with an expanded diameter section that contains a one way clutch 50 that is fixed in place by a clutch sleeve. The one way clutch may be a roller type clutch to permit rotation is one direction but restricts rotation in the opposite direction. As is apparent, it is within the scope of the present invention to provide other anti-reverse mechanisms on the reel if desired. A wave washer 58 is provided on the spool sleeve 42 between an end face 60 of the spool hub 28 and the crank member 62. Crank member 62 is provided with an outward bend at crank portion 61 and includes a crank knob 68. Opening 64 fixedly receives an end of the spindle 10 whereby rotation of the crank member 62 will likewise rotate spindle 10. The crank member is adapted to skewer inwardly toward the reel spool face by pressing against crank knob 68 due to the outward bend of crank portion 61. This is illustrated in FIG. 5 by arrow 110. Returning to FIGS. 2 and 3, the opening 64 of the crank member 62 is sized to provide necessary play which will allow inward movement of the crank when it is pressed toward the spool face. Only a minor amount of play between the opening and the spindle 10 is required in order to create a much larger movement (inward leverage) at the distal end of the crank. The leverage may be further enhanced by providing an outward (relative to the spool) bend to crank 62 as noted earlier. The amount of play provided is essentially imperceptible to a user. Crank knob 68 is fixed to the end of crank member 62 and in a manner that permits knob 68 to rotate about its longitudinal axis when manually rotating the crank. A fixed nut or pressed fitting 70 is provided on the end to secure the entire drag assembly to the reel. If an optional internal drag assembly is provided, knob 70 additionally functions as a drag control knob as will be further explained below. As is apparent, other means for enabling crank member 62 to skewer inwardly are within the scope of the present invention including, but not limited to, constructing the crank from a material that will bend inwardly when a force is applied but also return to its original shape once that force is no longer applied on knob 68. The crank could be provided with a mechanical pivot that is rigid and fixed while the crank is rotated but will pivot inwardly when force is applied on the crank.

A user may thus apply drag tension to the reel without having to let go of the reel handle. This is done by simply pushing the handle knob 68 inwardly toward the spool face 60. This action causes the wave washer 58 to compress against the spool face 60 and thereby create a frictional force against the spool to slow the pace at which line may be removed from the spool by a hooked fish. When the inward force on the handle is reduced, the wave washer recovers to its uncompressed configuration and the handle drag is disengaged.

Figure 4:
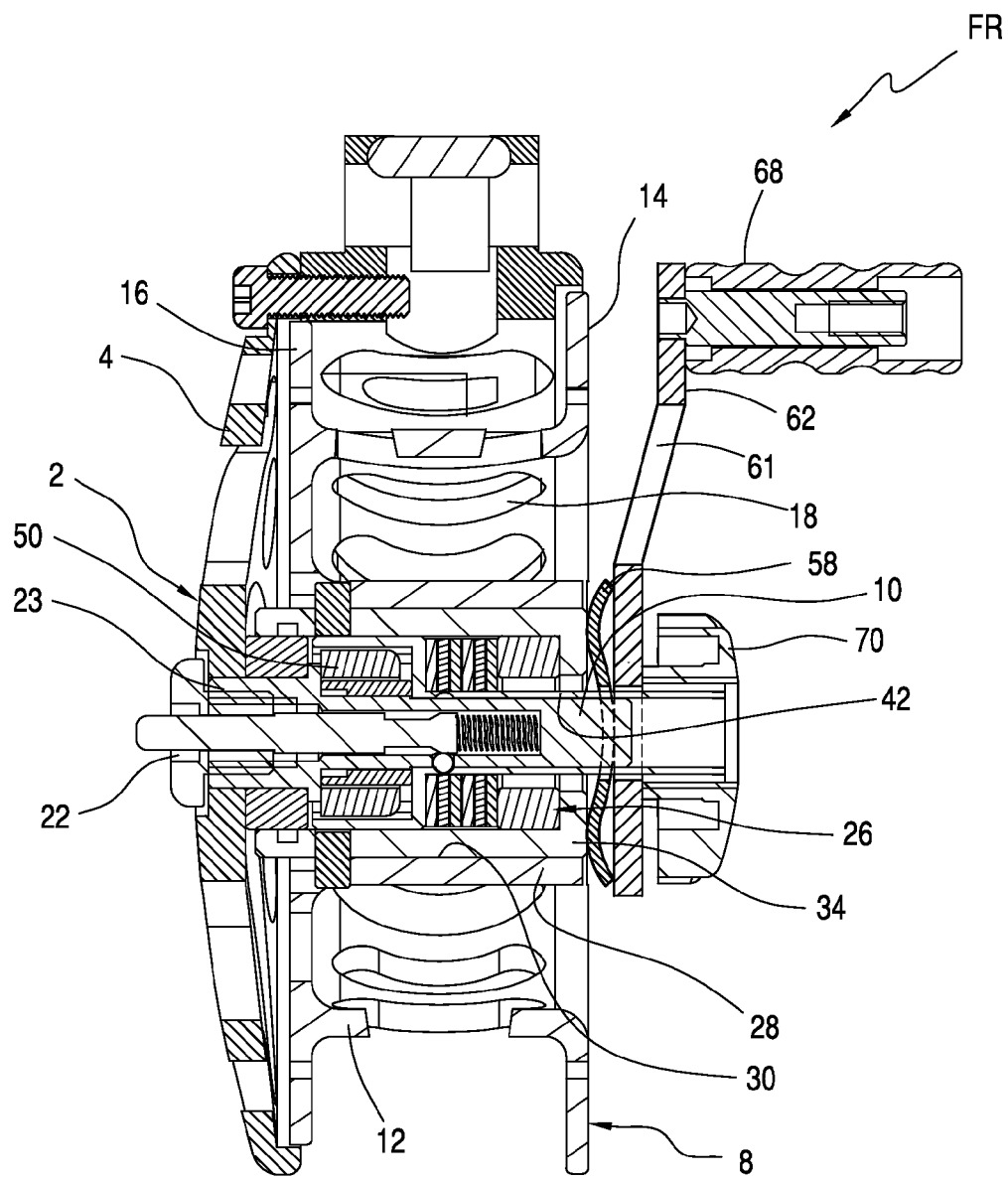
FIG. 4 is cross section of the reel shown in FIG. 3 as an alternative embodiment of the invention.

An alternative embodiment of the present invention is shown in FIG. 4 whereby an optional internal drag cartridge is provided in combination with the handle drag system as set forth above. Spindle 10 extends through a central passageway 22 of the reel housing 2. The reel housing 2 is secured to an end 23 of the spindle 10. Spindle 10 is also shown to extend though an optional drag assembly 26. This embodiment shows the handle drag assembly shown in FIGS. 1, 2 and 3 in combination with an optional internal drag assembly 26 fixed against the spool hub 28 at an interior race surface 30.

The components of the optional interior drag assembly 26 are sealed within a housing 34 having a narrow opening at one end and a second, larger diameter opening at an opposite end. A spool sleeve that is adapted to receive a rotating spindle is coaxially aligned within the longitudinal axis of the housing 34. One end of the spool sleeve is provided with an expanded diameter section that contains a one way clutch 50 that is fixed in place by a clutch sleeve. The one way clutch 50 is a roller type clutch that permits rotation in one direction but restricts rotation in an opposite direction. A drag adjustment knob 70 including a spring member (not shown) is provided, rotation of which will increase or decrease drag on the spindle by the internal drag cartridge 26.

The reduced diameter section of the spool sleeve contains a series of individual friction washers sandwiched against an abutment of the spool sleeve expanded diameter section. A quick release pin is provided to enable the spool to be removed from the housing. The quick release pin member has an end with a detent region received within a passageway in the spindle 10. A screw cap is secured at one end. The detent is operatively associated with a detent ball that rests within an annular groove that extends within the spindle 10 and spool sleeve. A user may adjust the drag tension to correspond to changes in the forces applied to the line by a hooked fish by letting go of the crank 62 and then turning the drag adjustment knob 70. Interior of the drag adjustment knob 70 is a drag spring (not shown) that rests against the crank member 62. The drag spring 72 exerts a force on the crank member 62 which then exerts a force on the drag housing 34. The drag housing 34 and the crank member 62 slide over the spool sleeve and compress the drag washers. The crank member is keyed at opening to the spool sleeve but the drag housing is not keyed to the spool sleeve and therefore is adapted to rotate radially around the spool sleeve. This provides the adjustable friction between the drag housing 34 and the spool sleeve 42 that results in drag on the spool produced by the internal drag assembly 26. As is apparent, the handle drag system described above may also apply drag to the spool independent of the internal drag assembly 26.

Figure 6:
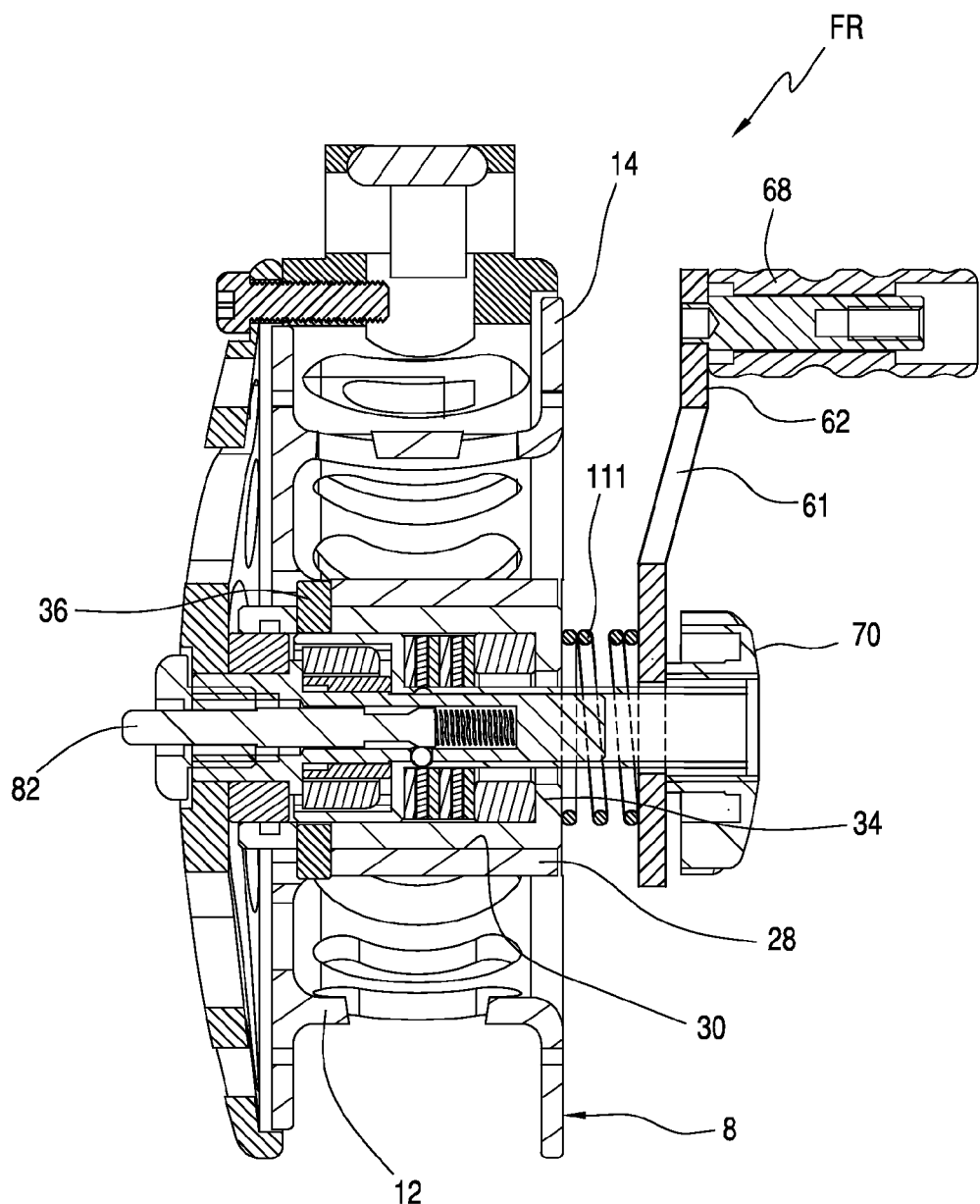
FIG. 6 is a cross section of the reel shown in FIG. 1 as an alternative embodiment of the present invention.

FIG. 6 illustrates an alternative embodiment of the invention and all reference numerals are the same as in the earlier embodiment except where specifically noted. In this embodiment the wave washer 58 is replace with a spring member 111. When handle knob 68 is levered inwardly toward the spool face 60, the spring 111 is caused to compress against the spool face 60 to thereby create a frictional force against the spool and slow the pace at which line may be removed from the spool by a hooked fish. When the inward force against the handle is reduced, the spring 111 returns to an uncompressed configuration and the handle drag mechanism will disengage.

The present invention may employ variations of the above disclosure. For example, the wave washer or spring may be constructed from a material that enhances or otherwise permits the washer to readily compress and then decompress under action of the inwardly skewered handle 62. The washer or the face of the spool may be constructed from a material having a desired coefficient of friction that efficiently increases drag on the spool face without having to very strongly urge the crank handle inwardly. As noted earlier, the fishing reel handle drag system of the present invention may be the sole drag mechanism on the reel. In that situation, the end face 60 of the reel spool (FIG. 2) is unitary and does not incorporate the face end of the interior drag system 26 housing. In this embodiment, drag is applied directly against the spool face.

Figure 7:
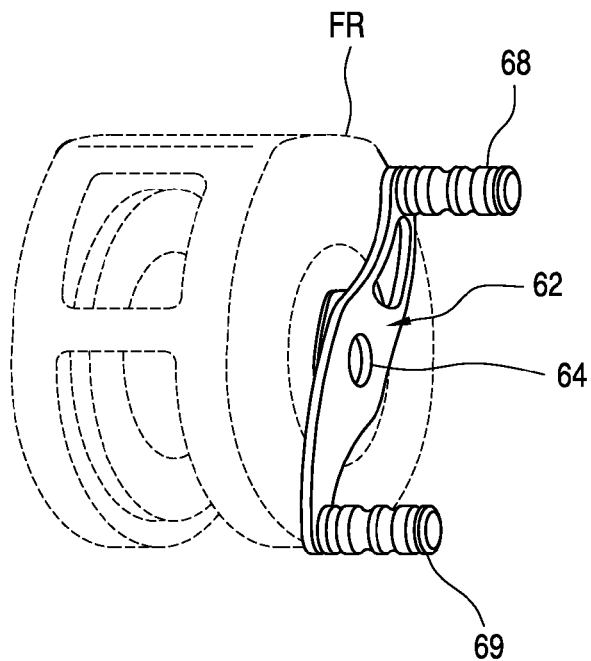
FIG. 7 is a perspective view illustrating an alternative embodiment of the present invention with the reel show in phantom lines.

FIG. 7 illustrates an alternative embodiment of the invention when used in connection with a bait casting reel FR. In this embodiment, all the elements noted with respect to the handle drag mechanism in FIGS. 1, 2 and 3 are provided but the crank member 62 is modified to extend the diameter of the reel spool with the crank opening 64 provided at the midpoint. A second crank knob 69 is provided. As is apparent, urging either of the crank knobs inwardly will create drag on the reel spool.

Figure 8:
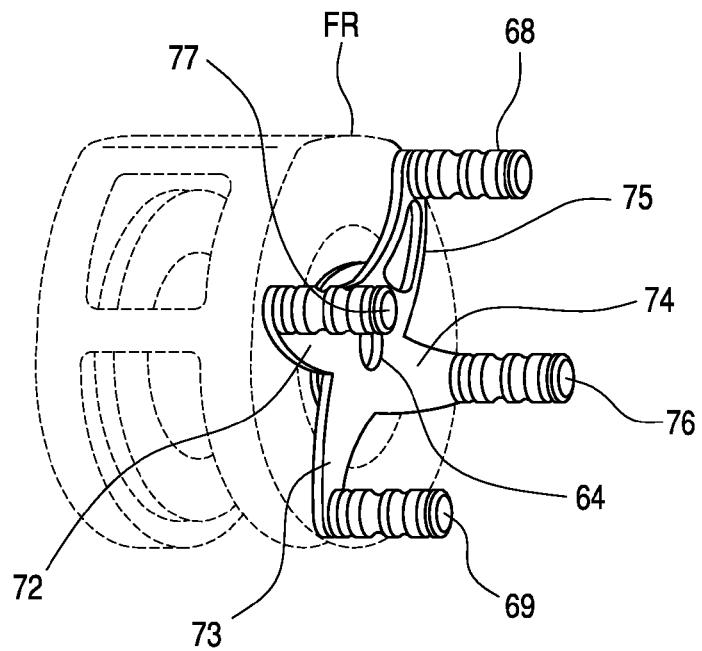
FIG. 8 is a perspective view illustrating an alternative embodiment of the present invention with the reel shown in phantom lines.

FIG. 8 illustrates another alternative embodiment of the invention when used in connection with a bait casting reel FR. In this embodiment, all the elements noted with respect to the handle drag mechanism in FIGS. 1, 2 and 3 included but the crank member 62 is modified to extend the diameter of the reel spool in four equidistant directions as sections 72, 73, 74, 75 with the crank opening 64 provided at the midpoint. Crank knobs 68, 69, 76, 77 are provided at the terminus of each of the crank member sections. As is apparent, urging any of the crank knobs inwardly will create drag on the reel spool.

While this invention has been described as having a preferred design, it is understood that it is capable of further modifications, uses and adaptations, both in whole and in part, while following the general principle of the invention and including such departures from the present disclosure as is known or customary practice in the art to which this invention pertains, and as may be applied to the central features of this invention.

I claim:

1. A fishing reel with drag system comprising;
   a) a reel housing;
   b) a shaft having first and second ends, the first end of the shaft is secured to the reel housing;
   c) a reel spool mounted on the shaft, the spool having at least one spool face, the spool being rotatable in first and second opposite directions;
   d) a crank, the crank is operatively engaged with the spool at all times, the crank rotates with the spool in the first direction;
   e) an anti-reversing mechanism, the anti-reversing mechanism prevents the crank from rotating with the spool when moving in the second direction;
   f) the crank is secured to the second end of the shaft and is adjacent the spool face and adapted to lever axially toward and away from the adjacent spool face; and
   g) a wave washer, the wave washer is provided on the shaft and between the crank and the spool face whereby when the spool is moving in the second direction and the crank is levered toward the spool face by a user, the wave washer is caused to be compressed to generate drag on the rotating spool.

2. A fishing reel with drag system a recited in claim 1 and wherein the anti-reversing mechanism is a one-way clutch device.

3. A fishing reel with drag system as recited in claim 2 and wherein the one way clutch is a roller type clutch.

4. A fishing reel with drag system as recited in claim 1 wherein the crank is provided with an opening for receiving the second end of the shaft to which it is secured, the opening is sized to be sufficiently larger than the diameter of the second end of the shaft so that the crank may lever axially relative to the shaft.

5. A fishing reel with drag system as recited in claim 1 and wherein the crank is provided with a first end and an opposite second end, the first end is provided with an opening for receiving the second end of the shaft to which it is secured and the second end is provided with a crank knob, a bended portion extends between the first and second ends wherein the crank opening and the crank knob lie in separate planes.

6. A fishing reel with drag system as recited in claim 1 and wherein the crank is constructed from a material adapted to temporarily flex.

7. A fishing reel with drag system as recited in claim 1 and wherein the wave washer is constructed from a flexible material.

8. A fishing reel with drag system as recited in claim 1 and further including an interior drag assembly, the interior drag assembly is fixed to the spool and rotatably mounted therewith and is adapted to provide controlled friction against the spool during rotation thereof.

9. A fishing reel with drag system as recited in claim 8 and wherein the interior drag assembly comprises a series of friction washers adapted to be selectively compressed so as to generate drag on the spool.

10. A fishing reel with drag system as recited in claim 8 and wherein the adjustable drag assembly and the anti-reversing mechanism are coaxially aligned on the shaft.

11. A fishing reel with drag system as recited in claim 1 and wherein the crank has at least a first end and a second end, the crank is secured to the second end of the shaft between the crank first and second ends.

12. A fishing reel with drag system as recited in claim 1 and further including at least one crank knob provided on the crank.

13. A fishing reel with drag system as recited in claim 1 wherein the wave washer is engaged with the crank at all times.

14. A fishing reel with drag system comprising;
   a) a reel housing;
   b) a shaft having first and second ends, the first end of the shaft is secured to the reel housing;
   c) a reel spool is mounted on the shaft, the spool having at least one spool face, the spool being rotatable in first and second opposite directions;
   d) a crank, the crank is operatively engaged with the spool at all times, the crank rotates with the spool in the first direction;
   e) an anti-reversing mechanism, the anti-reversing mechanism prevents the crank from rotating with the spool when moving in the second direction;
   f) the crank is secured to the second end of the shaft and is adjacent the spool face and is adapted to lever axially toward and away from the adjacent spool face; and
   g) a spring member, the spring member is provided around the shaft and between the crank and the spool face whereby when the spool is moving in the second direction and the crank is levered toward the spool face by a user, the spring member is caused to be compressed to generate drag on the spool.

15. A fishing reel with drag system a recited in claim 14 and wherein the anti-reversing mechanism is a one-way clutch device.

16. A fishing reel with drag system as recited in claim 15 and wherein the one way clutch is a roller type clutch.

17. A fishing reel with drag system as recited in claim 14 wherein the crank is provided with an opening for receiving the second end of the shaft to which it is secured, the opening is sized to be sufficiently larger than the diameter of the second end of the shaft so that the crank may lever axially relative to the shaft.

18. A fishing reel with drag system as recited in claim 14 and wherein the crank is provided with a first end and an opposite second end, the first end is provided with an opening for receiving the second end of the shaft to which it is secured and the second end is provided with a crank knob, a bended portion extends between the first and second ends wherein the crank opening and the crank knob lie in separate planes.

19. A fishing reel with drag system as recited in claim 14 and wherein the crank is constructed from a material adapted to temporarily flex.

20. A fishing reel with drag system as recited in claim 14 and further including an interior drag assembly, the interior drag assembly is fixed to the spool and rotatably mounted therewith and is adapted to provide controlled friction against the spool during rotation thereof.

21. A fishing reel with drag system as recited in claim 20 and wherein the interior drag assembly comprises a series of friction washers adapted to be selectively compressed so as to generate drag on the spool.

22. A fishing reel with drag system as recited in claim 14 wherein the spring member is engaged with the crank at all times.

23. A fishing reel with drag system as recited in claim 14 and wherein the spring member is a coil spring.

\* \* \* \* \*

UNITED STATES PATENT AND TRADEMARK OFFICE
CERTIFICATE OF CORRECTION

PATENT NO. : 9,743,651 B2
APPLICATION NO. : 14/559543
DATED : August 29, 2017
INVENTOR(S) : Gregory A. Header Page 1 of 2

It is certified that error appears in the above-identified patent and that said Letters Patent is hereby corrected as shown below:

On the Title Page

Item [57],
Delete "a reel spool is mounted on the spindle and has at least one spool" and replace with
-- a reel spool mounted on the shaft and has at least one spool --

In the Specification

Column 4,
Lines 10-11, replace "decrease drag on the spindle by the internal drag cartridge 26" and
replace with -- decrease drag on the spindle by the internal drag assembly 26 --

Column 4,
Line 26, delete "the drag spring 72 exerts a force" and replace with -- The drag spring exerts
a force --

Column 4,
Line 42, delete "embodiment the wave washer 58 is replace with a spring" and replace with
-- embodiment, the wave washer 58 is replaced with a spring --

Column 4,
Line 64, delete "drag system 26 housing" and replace with -- drag assembly 26 housing --

In the Claims

Column 5, Claim 2,
Delete "A fishing reel with drag system a recited in claim 1" and replace with -- A fishing reel
with drag system as recited in claim 1 --

Signed and Sealed this
Twelfth Day of June, 2018

Andrei Iancu
*Director of the United States Patent and Trademark Office*

Column 6, Claim 15,
Delete "A fishing reel with drag system a recited in claim 14" and replace with -- A fishing reel with drag system as recited in claim 14 --